June 22, 1948.    R. C. FERGUSON    2,443,788
SQUARING DEVICE
Filed Jan. 5, 1946
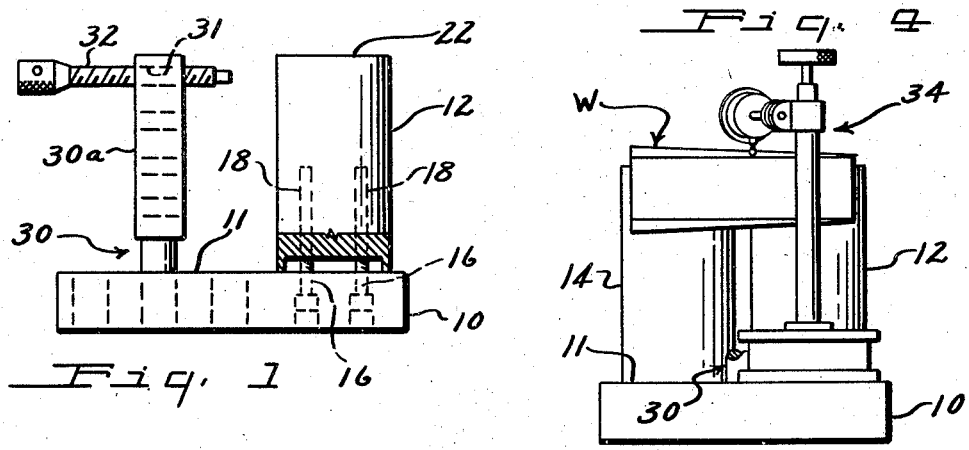
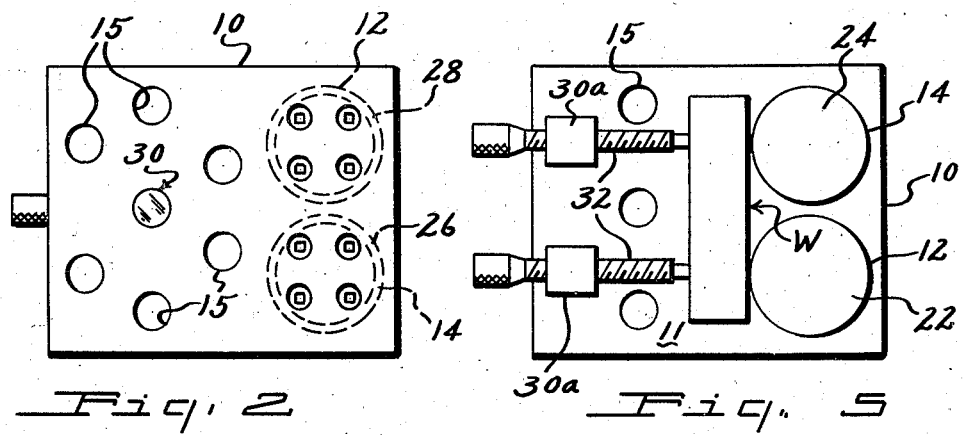
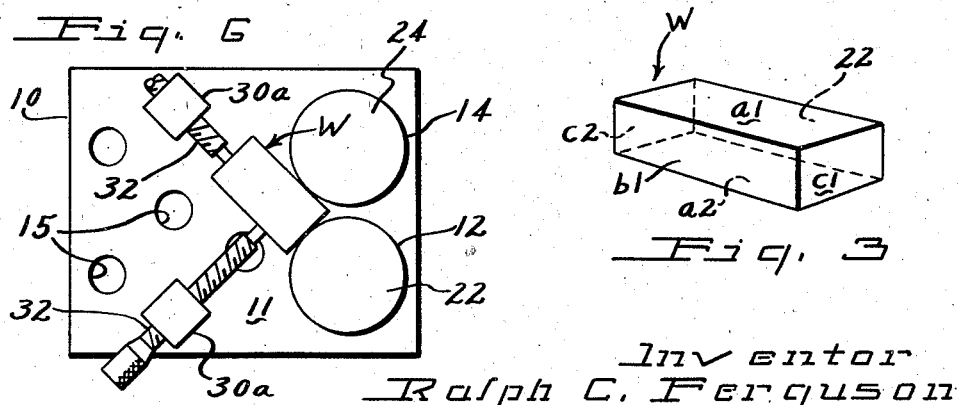
Inventor
Ralph C. Ferguson
By Massy & Graham
Attys Patented June 22, 1948

2,443,788

UNITED STATES PATENT OFFICE 2,443,788

SQUARING DEVICE

Ralph C. Ferguson, Hollydale, Calif., assignor to Walter W. Pierce, Whittier, Calif.

Application January 5, 1946, Serial No. 639,378

5 Claims. (Cl. 51—217)

My invention relates to a fixture designed to be used in the production of precision finished workpieces requiring opposite sides to be parallel and all angles between the sides to be exactly at right angles, the work being intended to be used as a gauge block or for any other purpose requiring the use of a very accurately machined block.

Precision machining of such workpieces can be done by the use of existing techniques only with the expenditure of considerable time and labor, using a face plate and angle plate in addition to the bed of the machine used, usually a precision grinder.

It is an object of the invention to provide a fixture which enables precision work of the kind described to be produced to fine limits of accuracy of the order of .00001 inch and better with comparatively little effort and with a very considerable saving of time as compared with present practice.

Another object of the invention is to provide a fixture which is capable of withstanding long continued use without requiring it to be refinished to restore its accuracy, the operations necessary to refinish the surfaces when this finally becomes necessary being of a simple nature.

Another object of the invention is to provide a rugged and accurate fixture which is simple and inexpensive to produce.

Further features and objects of the invention will appear in the following description taken in conjunction with the accompanying drawings.

The invention is hereinafter described and illustrated in a preferred form, but it is to be understood that the scope of the invention is not in any way limited by this illustrative showing but only as indicated by the scope of the appended claims.

In the drawings:

Fig. 1 is a side elevation of the fixture of my invention;

Fig. 2 is a bottom plan of the fixture;

Fig. 3 is a perspective view showing a typical workpiece which may for instance be intended to be used as a gauge block;

Fig. 4 is a view showing the workpiece being set up preliminary to an operation thereon, while held in the fixture;

Fig. 5 is a plan view showing the workpiece in position to be ground to a desired line; and Fig. 6 is a plan view showing the workpiece in position to receive a final grinding operation.

Referring now to Fig. 1, a base plate is indicated by the numeral 10, this base plate being accurately machined to provide upper and lower surfaces truly parallel to one another, the upper surface 11 being adapted for use as a face plate. The base plate is provided with a plurality of bores 15 to receive clamping members, as later described.

Two cylindrical abutment members 12 and 14 of the same length and diameter are mounted upon the base plate by a plurality of headed studs 16 passing through bores 15 in the base plate into threaded bores 18 extending into the cylinders. The upper end faces 22 and 24 of the cylinders are machined to be at right angles to the side surface of the cylinders while the lower end faces are machined out to leave peripheral flanges 26 and 28, respectively, which are carefully ground to present end surfaces exactly at right angles to the surface of the cylinders.

It will be seen from Fig. 2 that the base plate 10 is rectangular in plan although not necessarily so, the cylinders 12 and 14 being positioned adjacent one edge of the base plate and spaced apart from one another. The cylinders are ground true and their surfaces may be used as gauging surfaces although gauging of the work is unnecessary due to the inherent accuracy of the device and of the method of its utilization.

Clamps 30 are fitted into appropriate bores of the plurality of bores 15 formed in the base plate, to hold the work in position. The clamping pieces 30 may be of a known type provided with a body 30a having threaded bores 31 arranged at spaced points in the length thereof, and threaded stems 32 fitted in the threaded bores, which stems are screwed against the work W which is backed against the cylinders.

While any suitable means of securely holding the cylinders in vertical position upon the base plate may be used, I have found the construction described to be very satisfactory as it permits the cylinders, if continued use shows wear on the surface of the cylinder, to be released from the base 10 and rotated to bring an unworn surface into operative position, after which the studs 16 may be again carefully tightened up to hold the cylinders perfectly perpendicular to the top face of the base plate.

The procedure in producing an accurately finished workpiece is as follows: the workpiece W shown in Fig. 3 is a rectangular block in which opposite faces are indicated by the same letter of the alphabet, three contiguous sides being shown by $a1$, $b1$ and $c1$, while the sides opposite to the sides shown are indicated by $a2$, $b2$ and $c2$. It is assumed that the workpiece has been machined to approximate size and subsequently heat treated to harden it and allowed to cool to room temperature.

Sides $a1$ and $a2$ may be ground to be truly parallel in the usual manner by placing them on the bed of the grinder, which may be of a magnetic type in which the magnetic action of a current flowing through windings in the appropriately formed bed of the machine securely retains the workpiece in position. The grinding wheel is passed over the upper face $a1$, the current switched off and workpiece turned over to bring the opposite side $a2$ under the grinder and the grinding operation repeated. It may, however, be preferred to finish one face $a1$ only, in which case the subsequent steps to be described would be slightly varied. For greater accuracy it is desirable to lap the face $a1$ with which face operations are commenced.

The remaining operations to bring the remaining four sides of the block into parallelism and to be accurately at right angles to the adjacent sides may be carried out in the fixture of my invention with ease and rapidity, whereas according to the usual shop practice it would be necessary to repeatedly remove the piece to a face plate and angle plate for checking and determining the line to which the next cut should be taken for the next face to be ground.

These repeated operations on the face plate are a very decided disadvantage. Face plates are expensive equipment and most machine shops are provided with only one. Since they are in constant use by the machinists, it is very desirable to reduce the number of operations requiring the use of the face plate.

It is also very difficult to obtain absolute accuracy by carrying out the usual procedure in view of the numerous times the workpiece has to be set up and then ground. By the use of my fixture all operations after the first step of bringing one side to a finish or two sides into parallelism may be carried out on my fixture.

Fig. 4 shows the step of setting the line for the first of the second pair of faces. Finished face $a1$ is laid against the surface of the cylinders 22 and 24 and clamped thereagainst by use of the clamp 30 and threaded stem 32 shown in Fig. 1. A comparator 34, previously set, is then stood on the base of the fixture to enable the line to which grinding is to be carried to be determined. The work can then be clamped in position by the use of two of the clamps 30 and the fixture placed on the bed of the grinding machine to grind the second face $b1$.

It is next preferable to grind a third face $c1$ to be at right angles to the sides $a1$ and $b1$. To do this the workpiece is placed with a face $a1$ against one of the cylinders and face $b1$ against the other cylinder, and is held in this position as shown in Fig. 6 by a pair of clamps, each bearing against the workpiece in line with the center of the cylinder supporting the face of the workpiece opposite to that engaged by the clamp. The comparator is then used to indicate the line to which grinding of the third face is to be carried, the comparator removed and the face ground. This operation will provide three contiguous surfaces on the workpiece which will be accurately at right angles to one another. The remaining three sides of the workpiece can then be brought into parallelism with the sides already ground by the use of the face plate of the face 10.

In view of the extreme accuracy desired which, as before mentioned, may be upwardly of 100,000th part of an inch, the face plate is preferably first carefully cleaned, a number of parallels, which are accurately machined lengths of material, are placed on the bed and the workpiece brought to the proper height by arrangement of the parallels. The work is clamped with a finished face against the cylinders and a second finished face resting on the parallels and the side opposite the latter is ground, the operation being repeated until all surfaces are ground. By this procedure a workpiece such as the rectangular block shown, or a cube, may be readily and quickly brought to exact dimensions with each of its opposite sides truly parallel and all contiguous sides accurately at right angles to one another.

It will be obvious that by suitably modifying the procedure above described work pieces having more than four sides may be also accurately produced.

If, after long continued use, it is considered advisable to refinish the surfaces of the fixture, a light pass of the grinding wheel will true the face of the base while the cylinders can be ground while rotated in a lathe.

I claim:

1. A fixture of the class described comprising a base plate having parallel flat top and bottom surfaces, a pair of cylindrical abutment members disposed axially upright on the top surface of the base plate parallel to each other, means for adjustably securing the abutment members on the base plate whereby said abutment members may be adjusted to present a selected portion of their cylindrical surface for engagement by a workpiece, an upright secured at its bottom end to the base plate and clamp means carried by the upright for clamping a workpiece against the peripheral surfaces of the abutment members.

2. The fixture of claim 1 wherein the ends of each abutment member are at right angles to the periphery thereof.

3. A fixture of the class described comprising a base plate having parallel flat top and bottom surfaces and having a plurality of parallel apertures therethrough, a pair of parallel upright cylindrical abutment members each having parallel tapped holes opening through its bottom end, studs extending through said respective apertures and engaging in said respective tapped holes, said base plate having a plurality of bores therethrough spaced from said parallel apertures and means for clamping a workpiece against the peripheral surfaces of the abutment members, said last named means comprising a post mountable at its bottom end in selected ones of said bores, said post having a transverse tapped hole therethrough and a screw clamp threaded in said tapped hole for axial adjustment towards and away from the abutment members.

4. A fixture of the class described comprising a base plate having parallel flat top and bottom surfaces, a pair of upright abutment members mounted on said plate at right angles thereto, said plate having a plurality of bores therethrough spaced from said abutment members, and means for clamping a workpiece against the sides of said abutment members comprising a post mountable at its lower end in a selected bore, said post having a transverse tapped hole therethrough and a screw clamp threaded in said hole for axial adjustment toward and away from the abutment members.

5. A fixture of the class described comprising a base plate having a flat bottom surface, a pair of upright abutment members mounted on said plate at right angles to said bottom surface, said plate having a plurality of bores therethrough spaced from said abutment members, and means for clamping a work piece against the sides of said abutment members comprising a post mountable at its lower end in a selected bore and clamping means carried by said post adjustable for movement in a plane parallel to said bottom surface for clamping a work piece against said abutment members.

RALPH C. FERGUSON.

REFERENCES CITED

The following references are of record in the file of this patent:

UNITED STATES PATENTS

| Number | Name | Date |
|---|---|---|
| 1,220,287 | Styll et al. | Mar. 27, 1917 |
| 1,685,899 | Andrew | Oct. 2, 1928 |
| 1,952,206 | Hogg | Mar. 27, 1934 |
| 2,354,970 | Volkel | Aug. 1, 1944 |